H. D. REYNOLDS.
Smut Machine.
No. 4,663.  Patented July 28, 1846.
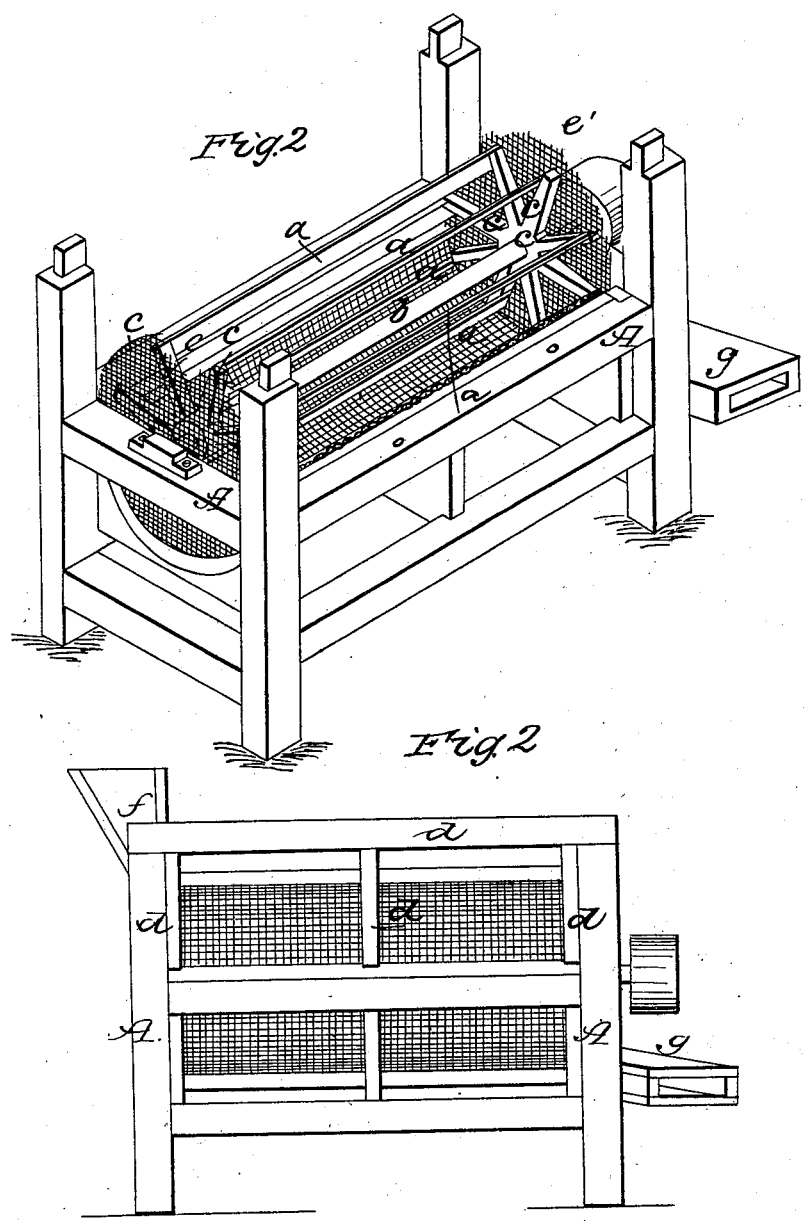

UNITED STATES PATENT OFFICE.

H. D. REYNOLDS, OF MILL HALL, PENNSYLVANIA.

SMUT-MACHINE.

Specification of Letters Patent No. 4,663, dated July 28, 1846.

*To all whom it may concern:*

Be it known that I, H. D. REYNOLDS, of Mill Hall, in the county of Clinton and State of Pennsylvania, have invented a new and useful Improvement in Smut-Machines for Cleaning Grain, and that the following is a full, clear and exact description of the principle or character thereof and of the manner of constructing and using the same, reference being had to the accompanying drawings, which make part of this my specification, in which—

Figure 1 is a side elevation of the machine and Fig. 2 a perspective view of the same, with the upper half of the cylindrical case removed to exhibit the arrangement of the beaters and the condition of the two ends of the casing which surround the beaters.

The same letters are used to indicate like parts in the two figures.

The nature of my invention consists in making the entire covering or casing which surrounds the rotating beaters of wire gauze in combination with rotating beaters connected with the shaft by means of arms only so as to afford a free entrance for the air at both ends to distribute the current of air on the grain equally throughout the length of the machine, and thus enable the beaters the more effectually and equally to act on the grain from end to end, which cannot be the case when either the beaters or the case have one of both ends closed as in the machines heretofore essayed.

In the accompanying drawings A is a frame adapted to the reception of the various parts of the machine the upper part being so arranged that it can be taken off with facility to give access to the rotary beaters $a, a, a, a$ which are straight bars of iron connected with the shaft $b$ by means of a set of arms $c, c, c, c$, at each end the shaft being supported in appropriate boxes in the end pieces of the frame. This shaft and beaters are surrounded with a wire gauze cylinder made of two parts the lower half permanently attached to the frame of the machine, and the upper half to a secondary frame $d, d, d, d$, so fitted to the main frame that it can be removed to give access to the beater by first removing the upper part of the main frame. The ends of this cylindrical casing are also covered with wire gauze disks $e, e'$. The end $e$ is provided with a hopper $f$ for the introduction of the grain near the top of the cylindrical casing, and the end $e'$ with a spout $g$ near the bottom for the discharge of the cleaned grain. The grain being introduced through the hopper is acted upon by the beaters in their rotation and thrown with violence against the wire gauze casing and carried down and gradually discharged through the spout $g$ in a cleaned state, while the smut and other impurities are discharged through the meshes of the wire gauze covering.

The rotation of the beaters, by their centrifugal action, produce two currents of air that enter the machine through the meshes of the wire gauze ends and are gradually changed in their direction and forced out through the meshes of the cylindrical casing to assist in carrying out the impurities; and as the two ends are opened and each current tends toward the middle of the length and then by the centrifugal force of the beaters, outward they assist the action of the beaters on the grain throughout their whole length and effectually carry off the impurities which would not be the case if either or both the ends of the beaters or the casing were closed.

I wish it to be distinctly understood that I do not make claim to a set of beaters connected with the shaft by arms at each end instead of closed ends or "heads" nor do I claim making a cylindrical covering or case with wire gauze and opened or wire gauze ends as these separately have long since been known; but

What I claim as my invention and desire to secure by Letters Patent is—

The combination of the rotary beaters with open ends in combination with the wire gauze ends of the case or covering for the purpose of admitting a current of air at each end of the machine to equalize the action of the beaters on the grain throughout the length of the machine and more effectually to discharge the impurities as described.

H. D. REYNOLDS.

Witnesses:
GEORGE PLATT,
YOUNT PLATT.